Jan. 6, 1953  J. POMAGALSKI  2,624,289
ENDLESS CABLE CONVEYER CARRYING LOADS THAT ARE
SUSPENDED OR REMAIN IN CONTACT WITH THE GROUND
Filed July 10, 1947   5 Sheets-Sheet 1

INVENTOR
JEAN POMAGALSKI
BY Davis, Davie & Faithfull
AGENT

INVENTOR
JEAN POMAGALSKI
BY
AGENT

Jan. 6, 1953　　　　　J. POMAGALSKI　　　　　2,624,289
ENDLESS CABLE CONVEYER CARRYING LOADS THAT ARE
SUSPENDED OR REMAIN IN CONTACT WITH THE GROUND
Filed July 10, 1947　　　　　　　　　　　　　　　5 Sheets-Sheet 3

INVENTOR

JEAN POMAGALSKI

BY *Davis, Davier Faithfull*

AGENT

Jan. 6, 1953   J. POMAGALSKI   2,624,289
ENDLESS CABLE CONVEYER CARRYING LOADS THAT ARE
SUSPENDED OR REMAIN IN CONTACT WITH THE GROUND
Filed July 10, 1947   5 Sheets-Sheet 4

INVENTOR
JEAN POMAGALSKI
BY Davis, Hoxie & Faithfull
AGENT

Patented Jan. 6, 1953

2,624,289

UNITED STATES PATENT OFFICE 2,624,289

ENDLESS CABLE CONVEYER CARRYING LOADS THAT ARE SUSPENDED OR REMAIN IN CONTACT WITH THE GROUND

Jean Pomagalski, Grenoble, France, assignor to Donald F. Miller, South Orange, N. J.

Application July 10, 1947, Serial No. 759,980
In France June 29, 1939

Section 1, Public Law 690, August 8, 1946
Patent expires June 29, 1959

10 Claims. (Cl. 104—204)

My invention has for its object improvements in endless cable conveyors carrying loads that are suspended or remain in contact with the ground. These improvements are applicable to all conveyors of the type considered whatever may be the nature of the loads transported; they are however of special advantage in the case when the conveyors are used, as conveyors for skiers or pedestrians to carry them up a slope. My invention has particularly for its object to increase the speed of operation and the reliability in use of the conveyors considered.

The driving cable to which may be engaged the attaching fittings provided with the ropes hauling the loads, is duplicated chiefly at the starting and arrival points by means of conveyors progressing at a reduced speed and adapted to make the loads start gradually from the starting point or to slow them down at the arrival point or at any other suitable point. It is possible to mount in series a plurality of slow conveyors at increasing or decreasing speeds from one conveyor to the next in order to obtain a gradual acceleration or deceleration of the loads. The slow conveyors are designed in a manner such as to provide when they meet the attaching fittings connected with the driving cable an automatic disconnection and connection with reference to said driving cable and the engagement or disengagement with reference to the active strand of the slow conveyor. The slow conveyors are constituted by endless strips or belts or the like means provided with teeth or the like means for engaging the attaching fittings driving the loads.

The fittings for attaching with the driving cable the rope to which are individually secured the driven loads include driving members requiring no adjunction of any auxiliary connecting member for the driving cable itself and they are designed in a manner such that they may come automatically into a disconnecting slideway at a predetermined point of the path of the conveyor and be then reconnected as desired. The attaching member is provided with driving surfaces contacting with the cable, which are perfectly concentric and allow the cable to rotate freely inside said member without meeting any bearing point whatever. This prevents any possibility of the fitting being wound round the cable when the latter has a tendency to become twisted. The opening for the passage of the cable through the attaching member is eccentric with reference to the body of the enclosing member, which allows providing on the latter large sections for assembling with the rope while reducing its diameter with a view to furthering its passage over the pulleys. The attaching member is connected with the rope engaging the hauled load through a lever adapted to pivot only in the longitudinal direction of the cable and which is adapted to increase the stability of the driving member through an increase of the leverage of the force preventing its winding round the cable when the latter has a tendency to twist.

The attaching member includes a tail end adapted to engage slopes which are specially provided near the pulleys in order to space the rope gradually away from the pulleys so that the passage over the latter may be performed without any jerks. When the arrangement shows a sharp incline, a pivoted lever is associated with the attaching member in order to retain for the latter an almost constant adhering torque in spite of the large angular modification in the tractional direction of the cable.

The disconnection of the attaching member is performed through the cooperation between the body of the attaching member on one hand and a roller located at the pivoting point of the lever engaging the rope on the other hand, with corresponding slopes provided at a desired point of the travel, said cooperation having for its object a modification in the relative position of the operative surfaces of the attaching member and of the operative cable whereby the latter may slide freely inside the former without driving it. The station constituted by the system of disconnecting slopes is suitably inclined in order to allow the attaching means or fittings to slide and to collect together in contact with suitable stops. At least one of the stops is capable of receding against the action of a spring so as to allow a further connection of the driving member with the driving cable. The stop that is capable of receding elastically includes a wedge acting as a stop for any further attaching means or fittings held in place, as long as the connecting arrangement has not resumed its position under the action of the spring, in order to release only one attaching means at a time.

The driving cable is duplicated by a carrier cable following the different irregularities of the slope so that the loads may move at a constant height over ground. The driving cable may also follow the irregularities of the slope or else be stretched along the general line joining its extreme points. In the first case, it is caused to assume the suitable outline through a passage over the pulleys of the carrier masts and underneath the pulleys of the guiding masts in a manner well known per se. The outline of the carrier cable, following of necessity the irregularities of the slope, is defined on one hand through its bearing over the convex projections on the carrier towers in the usual well known manner and on the other hand through its passage inside tubular guides designed in accordance with the invention and provided on concave projections pivotally secured to the guiding towers. The loads are suspended to the carrier cable through carriages with a single pulley or multiple pulleys, connected with a rope drawn by the driving cable. The pulleys borne by the carriages are provided with a shifting shoe engaging the interval between the cable and the pulley when the pulley is released through a breaking of said rope. The shifting shoe is pivotally secured to the axis of the pulley and is angularly connected with the latter through a selecting device selecting the direction of movement in a manner such that the pulley may rotate freely with reference to the shoe in the direction of progress over the cable and carries said shoe along with it when it rolls in the opposite direction. The movement selecting device is constituted by a catch mounted elastically on the pulley and that either recedes or abuts against the shifting shoe according to the direction of the relative movement between the pulley and the shoe.

When the hauled load is constituted by a person who may either be a skier or a pedestrian, the latter is suspended to the carrier cable through a rod or stick secured to the end of the rope or to the carriage provided with pulleys, said rod or stick being provided at its lower end with a small seat constituted by a yielding surface such as a membrane, a series of straps, a sheet of springs or the like stretched over an external support and suspended substantially through its center to the hauling member passing between the legs of the towed person.

Underneath each sloping station are arranged guiding members for the parallel introduction of sticks to be located to either side thereof at two or more levels, the clearance between the guiding members being defined in order to prevent any crossing of two sticks.

In order to take into account the elongation of the driving cable and the variations of its load, the wheel at the arrival station for said cable is suspended to the corresponding mast or lattice-tower corresponding thereto so as to allow its movement with reference to said tower in association with a counterweight. The suspension of the wheel is ensured through a cable passing in its groove and winding at one end over a winch with a non reversible control. This cable carries at its other end, after it has passed over the return transmission pulley, the balancing counterweight. The winch allows a lowering of the driving cable for examination and repair. The carrier cable passes over a return pulley mounted on the strap carried by the above-mentioned wheel at the arrival station, said strap being designed so as to allow an adjustment through a vertical displacement of the attaching point in order to provide a correct alignment of the progressing cable with the groove of the suspended wheel. A small wheel controlling a meter is arranged at any suitable point of the travel of the moving members so that it may be actuated at each passage of an attaching member, which allows ascertaining at any moment the accurate number of attaching means that are circulating.

In accompanying drawings I have illustrated by way of example and by no means in a limiting sense various forms of execution of the improved arrangement according to my invention. In said drawings.

Whatever may be the nature of the load that is being transported, whether an inert load or a human load, constituted by a skier or a pedestrian transported by the slope hauling rope, and indifferently as to whether the conveyor includes a cable that operates both for traction and carrying purposes or else a merely tractional cable associated or not with a carrier cable, the speed of displacement is limited by the importance of the jerks, applied at the starting of the load. These jerks should be avoided or reduced to a minimum in all cases, chiefly in the case of slope hauling ropes if it is desired to avoid any accidents due to the sudden change in the balance of the skiers who are being transported. To allow a rapid displacement as desired for large traffic and in order to simultaneously reduce the jerks at the starting, my invention incorporates an improvement of which an embodiment is illustrated in diagrammatic Fig. 1.

This improvement consists in duplicating the normal tractional cable 1 by means of an endless conveyor 2 arranged in a manner such that it provides for the starting of the loads at a speed which is less than that of the driving cable, after which it releases the loads when they have started and have engaged the driving cable. It is moreover possible to provide for a plurality of endless conveyors the speed of which increases from one conveyor to the next. A load is first started by the slower conveyor and then transferred to the next conveyor whereby it may engage a normal high speed conveyor when it has reached a speed of displacement approximating that of said normal conveyor.

This arrangement which is a special feature of the invention may operate as well for slowing down purposes at the point of arrival of the loads. The latter pass in this case from the normal conveyor to the slow conveyor and abandon the latter at the outlet point.

Figure 1:
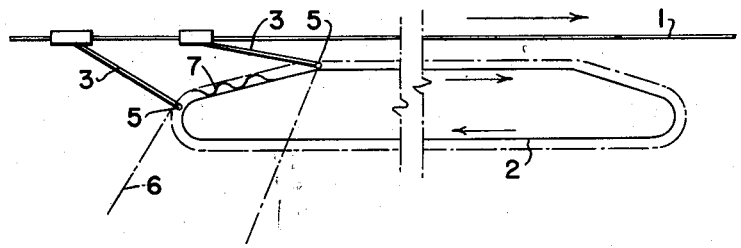
Fig. 1 is a diagrammatic elevational view illustrating an arrangement for starting a load at a reduced speed and driving it subsequently through a driving cable at a higher speed.
Figure 2:
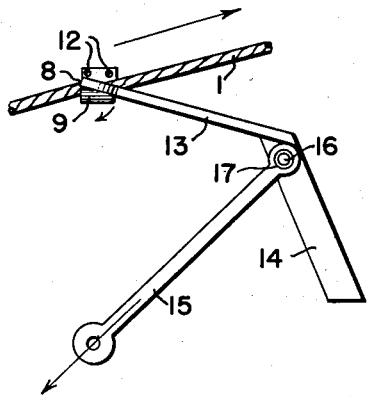
Fig. 2 is an elevational view of a driving member in its connected position with reference to the driving cable.

In the form of execution illustrated in Fig. 1, I have contemplated duplicating the driving cable 1 controlling a slope hauling rope for skiers. The ropes or rods for hauling the skiers are secured to the driving cable 1 through means allowing disconnection, such for instance as those described hereinafter.

The rope to which the skier is secured, is fastened for instance to the end of a lever 3, the head 4 of which engages driving cable 1 with a torsional and wedging effect. A projection 5 provides for disconnection when it meets suitable guiding cams secured to the points at which the skier is to engage or to abandon the slope hauling rope.

At the start, the lever 3 is engaged through slight traction with the rope 6 and its end, provided with a transverse projection, meets the slow conveyor 2 constituted for instance by an endless chain or a toothed strap mounted on suitable driving and tensioning pulleys that are distributed so as to give the upper strand an outline including a medial part that is parallel with the driving cable and two external ascending and descending parts.

The projection or other engaging means for the lever 3 enters external teeth 7 on the upper strand and rises gradually until it is disconnected with reference to the cable 1 whereby the cable is drawn only through the slow conveyor and at the speed of the latter. The engagement with the cable 1 is restored at the output end of the conveyor 2, which provides the advantages disclosed hereinabove, both at the starting and at the arrival in the case of a slowing down device. The arrangement used for slowing down is moreover applicable at any point of the travel.

Figs. 2 to 5 illustrate a possible form of the attaching means between the ropes or rods used for hauling and the driving cable 1. The attaching member 8 includes a housing part 9 provided with a bore 10 the size of which is slightly greater than that of the cable, said housing part also showing a notch 11 for securing said member to the cable. This notch carries through the agency of screws 12 a flat crook 13 assuming a slope for allowing the positioning in adjacent relationship of the attaching members on a sloping feeding station. The crook ends under the form of an extension 14 which, for normal operation, is perpendicular to the cable 1. This extension 14 is adapted to bear against slopes provided in the vicinity of the pulleys so as to space gradually the rope with reference to the pulley so that the passage over the latter may be operated without any jerks. A fastening lever 15 pivotally secured to the axis 16 increases the leverage of the force preventing the twisting of the attaching member round the cable 1. The shape of the slopes cooperating with the extension 14 that are not illustrated in the drawings should of course be selected in a manner such as to ensure a sufficiently progressive and jerkless movement. A small roller 17 secured to the same axis 16 as the securing lever makes the shifting of the attaching member on to the feeding station easier as disclosed hereinafter.

The operation of the attaching means is very simple. It is apparent that the traction exerted on the lever in the direction of the arrow produces two bearing points inside the housing part 9, said bearing points providing reactions on the cable as shown by the direction of the two small arrows. These bearing points provide the necessary adherence required for driving the system; this adherence is higher when the load to be drawn is more considerable. If for any reason whatever the connections were to be broken, the attaching member is equilibrated in a manner such that its own weight would hold it in place and no accident could occur. If the cable twists and even if an accident were to occur the housing part would engage it only through coaxial surfaces so that the cable will rotate freely with reference to the attaching means without being capable of turning it. The perforation 10 inside the housing part 9 is provided eccentrically whereby the housing 9 seen cross-sectionally shows a larger part for carrying the means for securing and engaging the rope without it being necessary to use in this case an exaggerated diameter for the housing part. Thus the passage of the attaching means on the pulleys is made easier.

Figure 6:
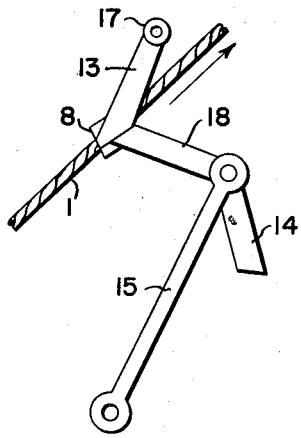
Fig. 6 is an elevational view of special attaching means designed for larger slopes, said means being shown in their position for upward movement.
Figure 7:
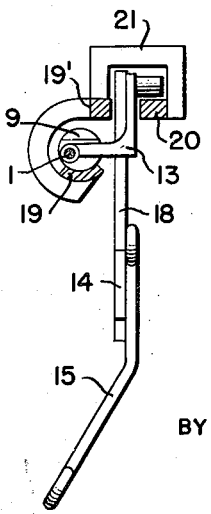
Figs. 7 and 8 are views of the same attaching means respectively in front of a sloping station and in position for downward movement in association with the bent lever.
Figure 8:
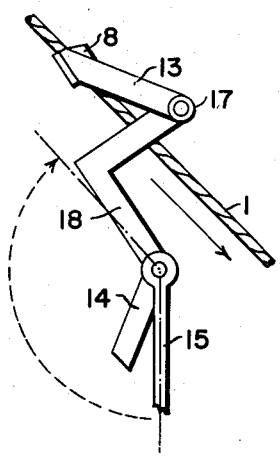

Figs. 6 to 8 show a possible modification of the attaching means according to the invention, which is more particularly of interest in arrangements operating over considerable slopes. The crook 13 has been modified and raised and furthermore there is inserted between said crook 13 and the tractional lever 15 a bent and pivoted lever 18. This modification has for its object to retain for the cable an adherence torque that is almost constant in spite of a considerable angular shifting between the drive direction and the cable.

Figure 9:
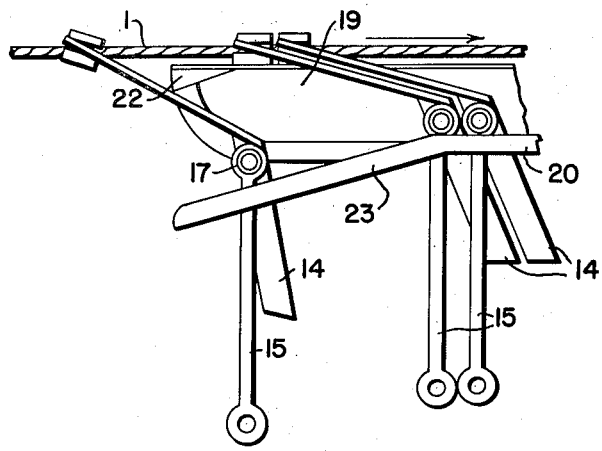
Fig. 9 is an elevational view of a sloping station with disconnecting means.
Figure 10:
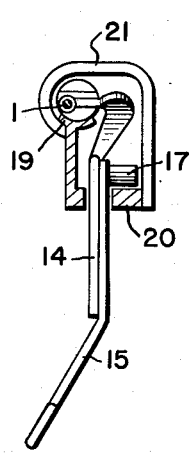
Fig. 10 is a side view of attaching means in its disconnected position on a sloping station.
Figure 11:
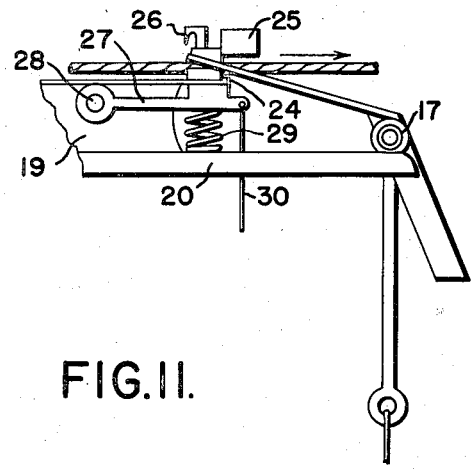
Fig. 11 is an elevational view of a clutch arrangement.

Figs. 9 to 11 illustrate a form of a sloping feed station including on one hand an automatic disconnecting device for the attaching means and on the other hand a device for stopping and locating, as desired, the attaching means on the driving cable. The feeding slope is constituted by two rails 19 and 20 coupled through fittings 21. The attaching means adhering to the moving cable 1 progresses in the direction shown by the arrow. The rail 19 includes at its front end a substantially funnel-shaped part 22 adapted to receive and to raise the housing part 9. The rail 20 is provided at its front end with an inclined slope 23 adapted to cooperate with the roller 17 so as to raise the end of the attaching means. The height of the rail 20 is adjusted in a manner such that the housing part 9 may come into parallelism with the cable 1. As said cable has no more action on the attaching means, it slides freely inside the latter.

The system of rails 19 and 20 forming the feeding station assumes a suitable incline so as to allow the attaching means of the sliders to collect at the rear of the rails against the stops 24 and 25. The stop 24 is a stationary one whereas the stop 25 is rigid, together with the wedge 26, with the lever 27 pivotally secured to the axis 28. The system is held in position by the compression spring 29. The cable 1 is again supposed to move in the direction of the arrow. If a traction is exerted on the control member 30, the system 24—26—27 will be lowered as it pivots round the axis 28. The upper part of the part housing the attaching means passes over the stationary stop 24. The stop 25 as it continues moving downwards recedes in front of the attaching means that are thus released. The attaching means move then off the rail 20 and are immediately engaged with the cable. The wedge 26 has for its object to engage a notch provided to this purpose at the rear of the housing part 9 so as to form a stop in front of a second attaching means and to hold the latter in place as long as the clutching means 24—26—27 have not resumed their operative position under the action of the spring 29. Thus only one attaching means may be released at a time.

Figure 12:
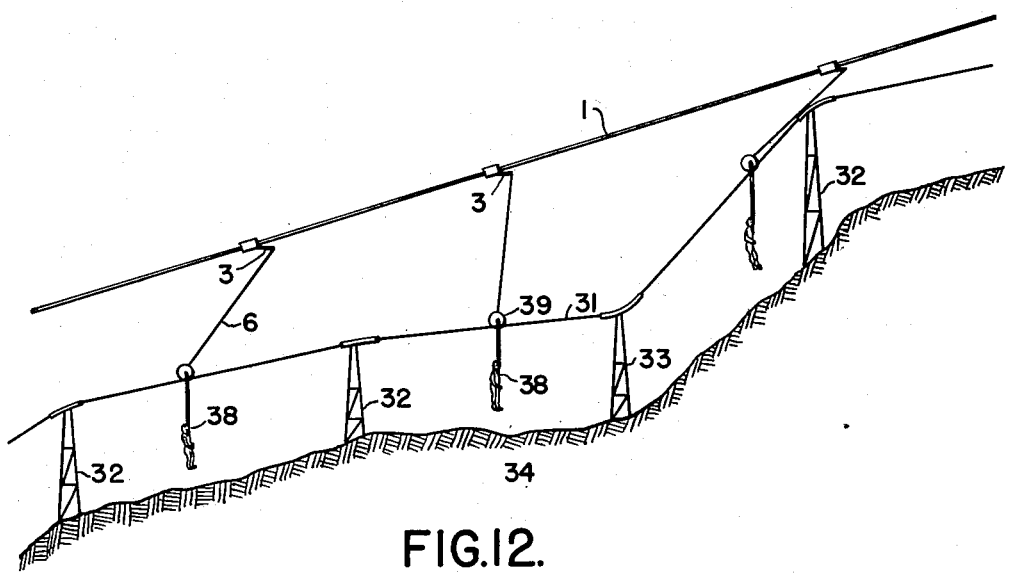
Fig. 12 is a diagram illustrating a conveyor with a driving cable and a carrier cable in front of a slope with an irregular outline.

Fig. 12 shows the solution that allows using a conveyor with suspended loads as a slope hauling rope for skiers or pedestrians. In this application it is of importance for the conveyed persons sitting on the small suspended saddle to remain permanently at a small height above ground whatever may be the gradient and outline of the slope over which he has to rise.

For this purpose the driving cable 1 is duplicated, according to my invention, by a carrier cable 31 that is mounted on supporting towers 32 and guiding towers 33 and extends along a broken line, the outline of which corresponds to that of the slope 34. The outline of the driving cable 1 does not necessarily follow exactly the outline of the slope and it may as illustrated extend along the general line joining the upper and lower points of the slope. If it follows exactly the outline of the latter, it assumes the desired shape through its passage over the pulleys of the supporting towers and underneath the pulleys of the guiding towers in a manner well known per se.

To assume the desired outline, the carrier cable 1 bears on the known convex projections on the supporting towers at 32 and on the concave projections 35 designed in accordance with the invention and carried by the guiding towers 33. The cable 31 (Fig. 13) passes inside a tubular guide 36 rigid with the projections 35 pivotally secured to a transversal axis 37 carried by the corresponding guiding tower 33.

Figure 16:
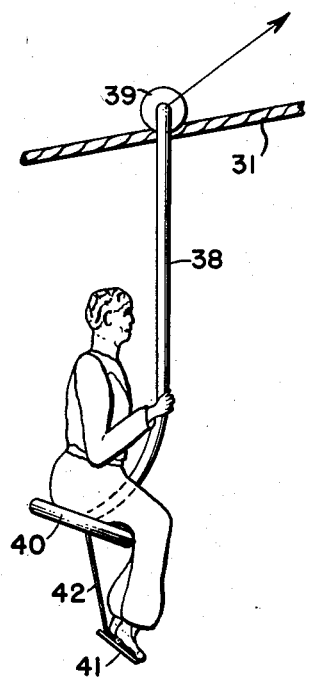
Fig. 16 shows at a larger scale a skier or a pedestrian carried by a small saddle hanging through a rigid rod from the carriage rolling over the carrier cable.

The skier or pedestrian is suspended to the carrier cable through a rigid perch or rod 38 (Fig. 16) that is secured through its upper end to a strap secured to the axis of a pulley 39 or to a carriage with a number of pulleys or trolleys rolling over the cable 31. At the lower end of the rod 38 is secured the small saddle 40 lined with rubber and on which the passenger is seated while his feet lie on the foot rest 41 secured to the rod 38, preferably through the agency of a yielding connection 42. The single pulley 39 or the carriage provided with a number of trolleys is yoked to the driving cable 1 through the agency of a rope 6 and the disconnectable means described hereinabove.

Figures 13, 14:
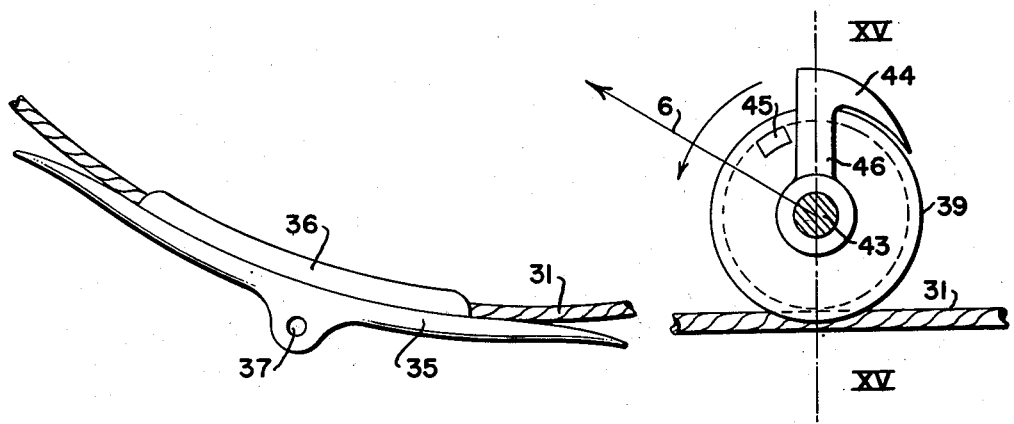
Fig. 13 is an elevational view of a concave projection providing for a definition of the outline assumed by the carrier cable.
Fig. 14 is a side view of a pulley with shifting means cooperating with the carrier cable.
Figure 15:
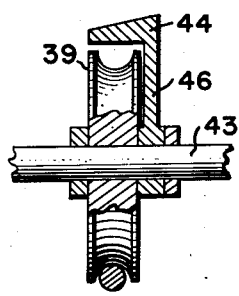
Fig. 15 is a transversal cross-section through line XV—XV of Fig. 14.

In case of the rope 6 breaking, it is of importance for the pulleys 39 of the carriage not to ride downwardly so that the passenger may return into contact with the ground while the pulley 39 or the equivalent carriage leaves the cable 31 so as not to hinder the progression of the following passengers. For this purpose I may resort to the de-railing arrangement illustrated in Figs. 14 and 15 and forming one of the improvements included within the scope of my invention. In this example, I have disclosed only the case of a single pulley but the arrangement described may be applied to all the pulleys of a single carriage. To the axis 43 of the pulley 39 is pivotally secured a shoe 44 covering the pulley rim through a certain angular length and the periphery of which forms an arcuate surface eccentrically arranged with reference to the pulley as illustrated in Fig. 14. The pulley 39 drawn by the rope 6 runs over the carrier cable while rotating in the direction of the arrow. The shoe 44 may remain in any angular position without disturbing the progression of the pulley along the cable 31 by reason of the interposition between the pulley and the shoe of a movement selector of any suitable type. The direction of operation of this movement selector is such that the pulley may rotate freely with reference to the shoe in the direction of its progression over the cable but drives the shoe along with it when it runs in the opposite direction. It has been assumed in the drawing that the pulley carries a catch 45 on its lateral side adjacent the arm 46 of the shoe 44. The catch is urged elastically outwards so as to pass under said arm 46 while receding inside the pulley at each revolution thereof. If the rope 6 is broken or is no longer in operative cooperation with the driving cable, the released pulley runs over the cable 31 in a direction opposed to the arrow and the catch 45 urges down against the cable 31 the shoe which acts then as a wedge for raising the pulley and rejecting it off the cable.

The small saddle that is suspended according to my invention is formed by a yielding surface such as a membrane, a series of straps, a sheet of springs or the like stretched over an outer support and yoked approximately through its center to a hauling member such as a rope, a crook, etc. passing between the legs of the hauled person.

Figure 3:
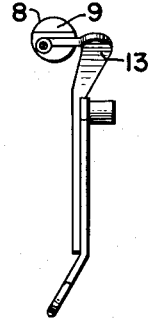
Fig. 3 is a side view of the member illustrated in Fig. 2.
Figure 4:
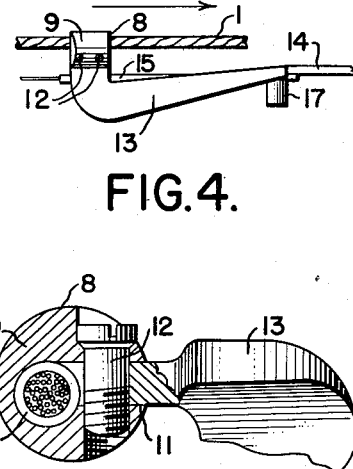
Fig. 4 is a plan view thereof.
Figure 5:
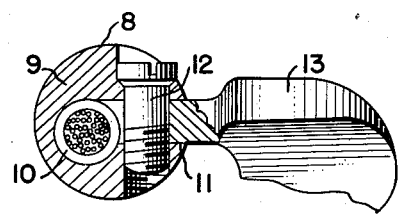
Fig. 5 is a detail view at a larger scale of the connecting means apparent in Fig. 6.

The saddle thus constituted forms a comfortable seat as shown in Fig. 3 and conforms automatically to the various figures of the persons hauled along whereby the stability is made more reliable through the fact that the traction and pivoting point of the hauled member lies always, by reason of the yieldingness of the saddle, to the front of the point of engagement between the latter and the hauled person.

Figures 17, 18:
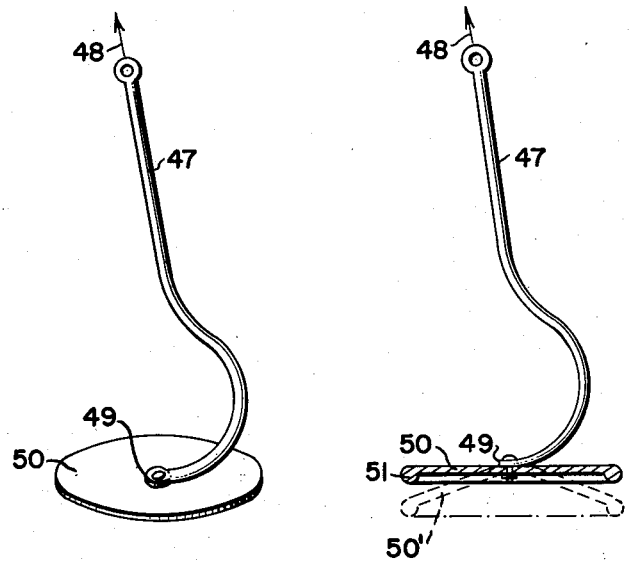
Fig. 17 is a perspective view of a small round saddle secured to a crook.
Fig. 18 is a cross sectional view of the same small saddle.

Such a saddle is illustrated in Figs. 17 and 18. The crook 47 is connected on one hand to the driving means at 48 and through its other end at 49 to the yielding membrane 50 stretched over the circular support 51. It is apparent that when anybody uses the apparatus after engaging the crook 47 between the legs, the traction executed through 48 will have for its result a driving action on the person while the diaphragm 50 is depressed into a position such as 59' so as to conform sufficiently to the figure of the person who is being hauled without hindering or hurting the latter in any manner whatever.

Figure 19:
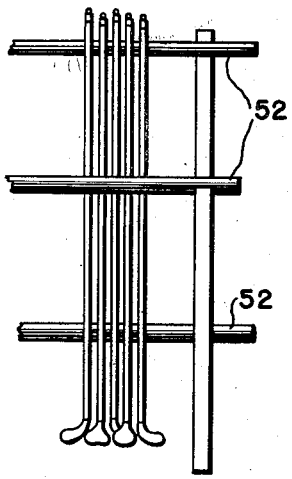
Fig. 19 is an elevational view of the guiding members for the parallel positioning of the sticks.
Figure 20:
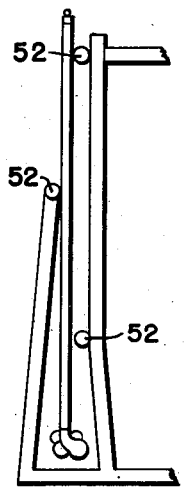
Fig. 20 is a side view of the same guiding members.

Figs. 19 and 20 illustrate an arrangement for the parallel carrying of rods, according to my invention. In the existing plants when the sticks or rods are collected at the starting station, their holding straps become easily entangled. To remove this drawback it has been sufficient heretofore to use roughly shaped guiding members that have the drawback, chiefly in the case of large output plants, of leading to a considerable loss of time by reason of the sorting it is generally necessary to perform. The guiding means arranged according to my invention removes these drawbacks. They are constituted by bars 52 located to either side at two or more points of the height of the sticks or rods to be held. They thus provide a perfectly parallel spacing between said sticks. The play between the guiding members is defined in a manner such that it is impossible for any two sticks to cross one another.

In most of the slope hauling ropes used to this day, the fly-wheel or pulley at the arrival station is mounted on a rail in a manner such that, in order to take into account the possible lengthening of the driving cable, it is necessary to provide for an arrival station of considerable length. To remove this drawback, and in accordance with my invention, the pulley at the terminal end of the plant is secured to the corresponding tower so that it may move nearer or further away from the latter in cooperation with a movable counterweight adapted to slide vertically with reference to the tower.

Figure 21:
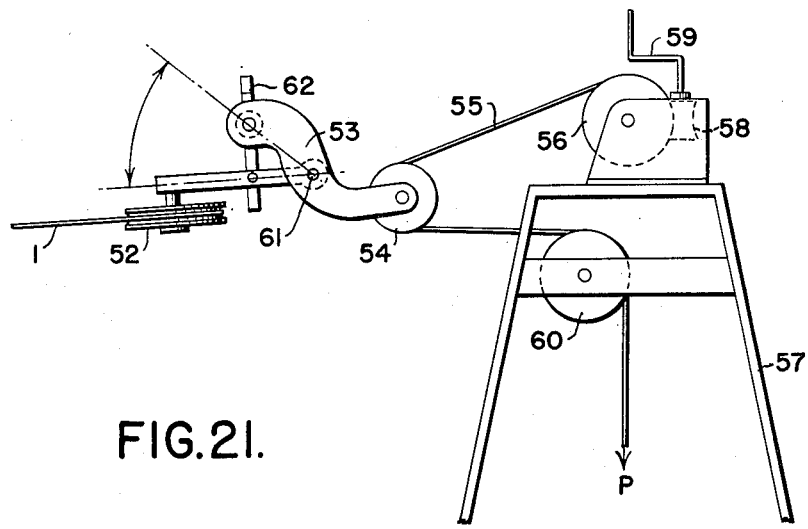
Fig. 21 is a diagram illustrating means for suspending the driving cable to the lattice tower at the arrival station.

Fig. 21 shows diagrammatically such an arrangement. The arrival pulley 62 is carried by a strap 53 provided with the pulley 54 in the groove of which may pass a cable 55 winding through one end over a winch 56 the frame of which is secured to the upper end of the tower 57. This winch is controlled through any suitable mechanism that is shown by way of example in the drawings under the form of a worm 58 provided with a controlling crank 59 and engaging a worm wheel rigid with the winch. At its other end the cable 55 passes over a transmission pulley 60 pivotally secured to the tower and receives a counterweight P. When the cable I has lengthened to an extent such that the counterweight is near ground, it is sufficient to give a few turns to the crank for returning it to a height suitable for proper operation. According to a particular feature of my invention, the pulley 62 is preferably mounted in a manner such that the position of its medial plane may be adjusted. In the embodiment illustrated in Fig. 21, there is provided to this end a strap 53 constituted by two parts pivotally secured together at 61 while a worm 61' engaging members pivotally secured to the two parts of the strap 53 allows modifying the angle between said two parts for adjusting the position of the medial plane of the pulley 62 and bringing it exactly in the plane containing the resultant of the stresses due to the tension of the cable and to the weight of the suspended loads. Preferably, and in order that the adjustment may remain a correct one, the pulleys are carried by ball or roller bearings.

Figure 22:
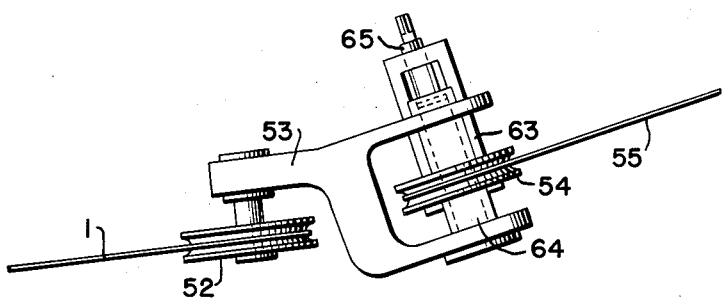
Fig. 22 shows a modification of the pulley-carrying strap in the suspension means illustrated in Fig. 21.

Fig. 22 shows a modified form of the adjusting means. The strap 53 is made of a single rigid part and the pulley 54 is carried by it with its plane substantially in parallelism with that of the pulley 62. This pulley 54 is pivotally secured to a strap 63 that may be shifted under the action of a threaded rod 64 along a guide 65 on the strap 63 in order to adjust the relative position of the plane of the pulley 62 and of the two strands of the cable I.

Figure 23:
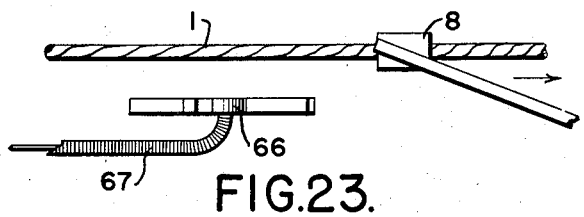
Fig. 23 is a diagramamtic elevational view of an automatic control arrangement of the number of attaching means that are operative at any moment.
Figure 24:
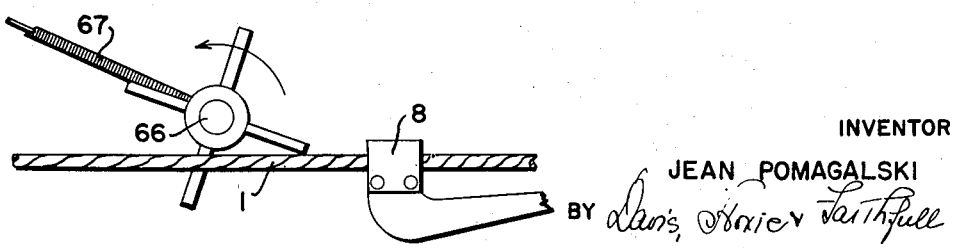
Fig. 24 is a plan view corresponding to Fig. 23.

In order to ascertain at any moment the exact number of attaching means that are circulating, I arrange in accordance with my invention, at any suitable point of the travel, a small wheel 66 the arms of which are arranged in a manner such with reference to the cable that each time an attaching member passes, the latter necessarily drives one of the arms of the wheel with it as shown in Figs. 23 and 24. The small wheel controls a meter that may be located on the very shaft of the wheel or else be controlled at a distance through the agency of a sheathed transmission 67 as illustrated in the drawing. In this case the meter may be located at any suitable accessible point.

Obviously my invention is by no means limited to the embodiments that have been more particularly described and illustrated. I may, without widening the scope of the invention modify, according to circumstances and applications, the details of construction and of mounting of my conveying plant. On the other hand, it is possible to substitute for the different members or arrangements, described and illustrated merely by way of example, other equivalent members or arrangements or members or arrangements producing the same result.

What I claim is:

1. An endless cable conveyor for towing loads up a mountain or the like comprising in combination an endless traction cable; a carrier cable; means for supporting said carrier cable along a path substantially parallel to the varying slope of the mountain; a plurality of roller means movable along said carrier cable; towing means connected at one end to said roller means and adapted for connection to a load at their other end; and disengageable connecting means between each of said roller means and said traction cable.

2. An endless cable conveyor for towing loads up a mountain or the like comprising in combination an endless traction cable; a carrier cable; means for supporting said carrier cable along a path substantially parallel to the varying slope of the mountain; a plurality of roller means movable along said carrier cable; towing means connected at one end to said roller means and adapted for connection to a load at their other end; disengageable connecting means between each of said roller means and said traction cable; a coupling member forming part of said connecting means; an internal bore provided in said coupling member for receiving said traction cable, the said bore having a diameter in excess of said traction cable; and lever means forming part of said connecting means for alternatively shifting the position of said coupling means from a slanting to a parallel disposition of said bore relative to said traction cable so as to permit alternatively free passing of said traction cable through said bore and wedging of said traction cable in said bore.

3. An endless cable conveyor for towing loads up a mountain or the like comprising in combination an endless traction cable; a carrier cable; means for supporting said carrier cable along a path substantially parallel to the varying slope of the mountain; a plurality of roller means movable along said carrier cable; towing means connected at one end to said roller means and adapted for connection to a load at their other end; a coupling member; an internal bore provided in said coupling member for receiving said traction cable, the said bore having a diameter in excess of said traction cable; an arm extending from said coupling member and being rigid therewith; a lever pivoted with one end to said arm; cable means connecting the other end of said lever with said rollers; and a guide member having one end pivoted to said arm coaxially with said lever so as to be movable with the latter and having its free end adapted for engagement by relatively stationary abutments whereby said coupling member may be shifted from a slanting to a parallel disposition of said bore relative to said traction cable so as to permit alternatively free passing of said traction cable through said bore and wedging of said traction cable in said bore.

4. An endless cable conveyor for towing loads up a mountain or the like comprising in combination an endless traction cable; a carrier cable; means for supporting said carrier cable along a path substantially parallel to the varying slope of the mountain; a plurality of roller means movable along said carrier cable; towing means connected at one end to said roller means and adapted for connection to a load at their other end; a cylindrical coupling member; an internal bore provided eccentrically in said coupling member for receiving said traction cable, the said bore having a diameter in excess of said traction cable; an arm extending from said coupling member and being rigid therewith; a lever pivoted with one end to said arm; cable means connecting the other end of said lever with said rollers; and a guide member having one end pivoted to said arm coaxially with said lever so as to be movable with the latter and having its free end adapted for engagement by relatively stationary abutments whereby said coupling member may be shifted from a slanting to a parallel disposition of said bore relative to said traction cable so as to permit alternatively free passing of said traction cable through said bore and wedging of said traction cable in said bore.

5. A device for coupling a load to and uncoupling it from a traction cable, which comprises a coupling member having an internal bore through which the cable is slidable, a load-carrying lever connected to the coupling member and operable under the load on the lever to tilt the coupling member and its bore relative to the cable, whereby the cable is wedged in the bore and draws the coupling member with the cable, a stationary abutment adjacent the path of the traction cable, and an element connected to the coupling member and engageable with said abutment, in the movement of the cable, to tilt said member and shift its bore into parallelism with the cable, thereby permitting free passage of the cable through the bore.

6. A device according to claim 5, comprising also an arm rigidly connected to the coupling member and extending in the general direction of the cable, said lever being pivoted to the arm and connected therethrough to the coupling member.

7. A device according to claim 5, in which said abutment is a ramp sloping upward in the direction of movement of the cable, whereby the bore is tilted gradually into said parallelism with the cable.

8. A device according to claim 5, comprising also a stationary rail disposed generally parallel to the cable and extending from said abutment in the direction of movement of the cable, the abutment sloping upward in said direction to the rail, the rail being sufficiently long to retain simultaneously a plurality of said elements of separate coupling members and thereby form a storage rack for several coupling and uncoupling devices.

9. A device according to claim 5, comprising also a stationary rail disposed generally parallel to the cable and extending from said abutment in the direction of movement of the cable, the abutment sloping upward in said direction to the rail, the rail being sufficiently long to retain simultaneously a plurality of said elements of separate coupling members and thereby form a storage rack for several coupling and uncoupling devices, the rail having a discharge end remote from said abutment, a stop adjacent said discharge end and engageable with a coupling member on the cable to retain said element on the rail, and trip mechanism operatively connected to the stop for releasing the coupling member.

10. A device according to claim 5, comprising also an arm rigidly connected to the coupling member and extending in the general direction of the cable, said lever being pivoted to the arm and connected therethrough to the coupling member, said element being mounted on the pivotal axis of the arm and lever.

JEAN POMAGALSKI.

REFERENCES CITED

The following references are of record in the file of this patent:

UNITED STATES PATENTS

| Number | Name | Date |
|---|---|---|
| 1,422,650 | Barton | July 11, 1922 |
| 2,087,232 | Constam | July 20, 1937 |
| 2,152,235 | Bannerman et al. | Mar. 28, 1939 |
| 2,285,636 | Wallace | June 9, 1942 |
| 2,325,141 | Lloyd | July 27, 1943 |

FOREIGN PATENTS

| Number | Country | Date |
|---|---|---|
| 825,278 | France | Nov. 27, 1937 |
| 198,603 | Switzerland | June 30, 1938 |